(12) United States Patent
Israeli et al.

(10) Patent No.: US 10,429,890 B2
(45) Date of Patent: Oct. 1, 2019

(54) LOCATION-BASED POWER SAVING SOLUTION FOR WIRELESS DOCKING PRODUCTS

(71) Applicant: Intel IP Corporation, Santa Clara, CA (US)

(72) Inventors: Timor Israeli, Kfar Shmuel (IL); Eduard Kvetny, Rishon-Lezion (IL); Lior Yeheskiel, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 238 days.

(21) Appl. No.: 14/788,475

(22) Filed: Jun. 30, 2015

(65) Prior Publication Data

US 2017/0003713 A1 Jan. 5, 2017

(51) Int. Cl.
*G06F 13/00* (2006.01)
*G06F 1/16* (2006.01)
(Continued)

(52) U.S. Cl.
CPC ........ *G06F 1/1632* (2013.01); *G06F 13/4081* (2013.01); *H04B 1/40* (2013.01); *H04W 4/021* (2013.01); *H04W 4/80* (2018.02); *H04W 24/10* (2013.01); *H04W 52/0229* (2013.01); *H04W 52/0235* (2013.01); *H04W 52/0245* (2013.01); *H04W 52/0254* (2013.01); *H04W 84/12* (2013.01); *H04W 88/08* (2013.01); *Y02D 10/14* (2018.01); *Y02D 10/151* (2018.01); *Y02D 70/00* (2018.01); *Y02D 70/142* (2018.01);
(Continued)

(58) Field of Classification Search
CPC .. G06F 1/1632; G06F 13/4081; H04W 24/10; H04W 4/021; H04W 4/008; H04W 52/0229; H04W 52/0235; H04W 52/0245; H04W 52/0254; H04B 1/40
USPC ......................................................... 710/304
See application file for complete search history.

(56) References Cited

U.S. PATENT DOCUMENTS

| 6,236,674 B1 * | 5/2001 | Morelli ................ H04B 1/1615 375/219 |
| 2013/0145050 A1 * | 6/2013 | Huang ................ H04M 1/7253 710/3 |

(Continued)

FOREIGN PATENT DOCUMENTS

| CN | 103687056 A | 3/2014 |
| CN | 104661326 A | 5/2015 |

(Continued)

OTHER PUBLICATIONS

Extended European Search Report received for European Patent Application No. 16173425.6, dated Nov. 3, 2016, 8 pages.
(Continued)

*Primary Examiner* — Chun Kuan Lee
(74) *Attorney, Agent, or Firm* — Schiff Hardin LLP

(57) ABSTRACT

Described herein are techniques related to one or more systems, apparatuses, methods, etc. for implementing a location-based power saving solution for docking station products. A wireless docking station communicates with a docking wireless device. The docking station is activated when the docking wireless device is within a pre-configured coverage area of the docking station. The docking station is deactivated when the docking wireless device is outside the pre-configured coverage area.

15 Claims, 8 Drawing Sheets

(51) Int. Cl.
*H04W 52/02* (2009.01)
*G06F 13/40* (2006.01)
*H04B 1/40* (2015.01)
*H04W 4/021* (2018.01)
*H04W 24/10* (2009.01)
*H04W 4/80* (2018.01)
*H04W 84/12* (2009.01)
*H04W 88/08* (2009.01)

(52) U.S. Cl.
CPC .......... *Y02D 70/144* (2018.01); *Y02D 70/164* (2018.01); *Y02D 70/166* (2018.01)

(56) References Cited

U.S. PATENT DOCUMENTS

| | | | |
|---|---|---|---|
| 2014/0095755 A1 | 4/2014 | Gao et al. | |
| 2014/0154984 A1* | 6/2014 | Perrin | H04W 52/325 455/41.2 |
| 2014/0274115 A1* | 9/2014 | Michalson | H04W 4/028 455/456.1 |
| 2014/0327540 A1 | 11/2014 | Shin et al. | |
| 2014/0370909 A1* | 12/2014 | Natucci, Jr. | H04W 52/0251 455/456.1 |
| 2015/0056920 A1 | 2/2015 | Huttunen et al. | |
| 2015/0141045 A1* | 5/2015 | Qiu | H04W 4/021 455/456.1 |
| 2016/0081132 A1* | 3/2016 | Lee | H04W 48/14 370/338 |
| 2016/0088550 A1* | 3/2016 | Rabii | H04W 48/18 370/310 |

FOREIGN PATENT DOCUMENTS

| | | |
|---|---|---|
| WO | 2013/114263 A1 | 8/2013 |
| WO | 2015/047329 A1 | 4/2015 |

OTHER PUBLICATIONS

Office Action dated Jan. 3, 2019 for Chinese Patent Application No. 201610364757.8.

\* cited by examiner

LOCATION-BASED POWER SAVING SOLUTION FOR WIRELESS DOCKING PRODUCTS

BACKGROUND

A docking station arrangement may provide a way of connecting peripherals such as a monitor, a keyboard, a mouse, an external hard drive, a webcam, etc. to a device, such as a laptop computer. A wide range of different devices such as mobile phones, tablets, etc. may be docked to provide a convenient connection to these peripherals.

The docking station arrangement may facilitate a wireless charging and a wireless connectivity to the wireless device. For example, the wireless charging may be implemented through a power transfer from the docking station to the wireless device. The wireless power transfer may require, for example, a set of electrodes to be installed or mounted in the wireless device and the docking station. On the other hand, the wireless connectivity may require additional coupler antennas to be installed in the wireless device and the docking station.

In order to provide a good User Experience (UX), the docking station or devices must comply with severe constraints. For instance, to allow a satisfactory video quality, the docking devices are assembled with very high bit rate wireless technologies, such as WiGig (i.e., IEEE 802.11AD). Another requirement for a good UX refers to automatic docking. To perform the automatic docking with good responsiveness, both devices are required to perform WiGig scanning and discovery processes with relatively high duty cycle, which results in a negative impact on platform power consumption for both devices.

Accordingly, a solution to deal with high power consumptions during scanning and discovery processes is desired.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a location based—power savings in a wireless docking station or other docking station products. For example, the wireless docking station may include a transceiver circuitry configured to facilitate high data rate WiGig communication with a docking wireless device. In this example, the transceiver circuitry of the docking station is activated when necessary in order to save power consumption during scanning and discovery processes to establish the WiGig data communication.

For example, the transceiver circuitry of the docking station is initially turned OFF while the docking wireless device is still outside a pre-configured coverage area of the docking station. In this example, a geo-fencing approach may be implemented by other wireless devices such as a wireless fidelity access point (Wi-Fi AP) in order to detect the present location of the docking wireless device.

Upon detection by the Wi-Fi AP that the docking wireless device has entered the pre-configured coverage area, the Wi-Fi AP transmits a triggering signal to the docking station. The triggering signal, for example, is utilized as the basis for activating (i.e., turning ON) the transceiver circuitry of the docking station.

With the activated transceiver circuitry, the transceiver circuitry commences a scanning operation and upon verification of identity and authorization of the docking wireless device, the WiGig data communication is established between the two.

In other implementations, other radio interface features of the docking station such as Bluetooth communication, Wi-Fi communication, and the like, are utilized to receive the triggering signal from the detecting wireless devices in the example above. Furthermore, the radio interface feature may be utilized to receive the present location of the docking wireless device where the present location is detected by Location Based Service (LBS) feature (e.g., Global Positioning System (GPS)) of the docking wireless device. Furthermore still, a direct detection and measurements by the docking station of a received signal strength indicator (RSSI) from the docking wireless device may be utilized as a basis for the triggering signal.

Figure 1:
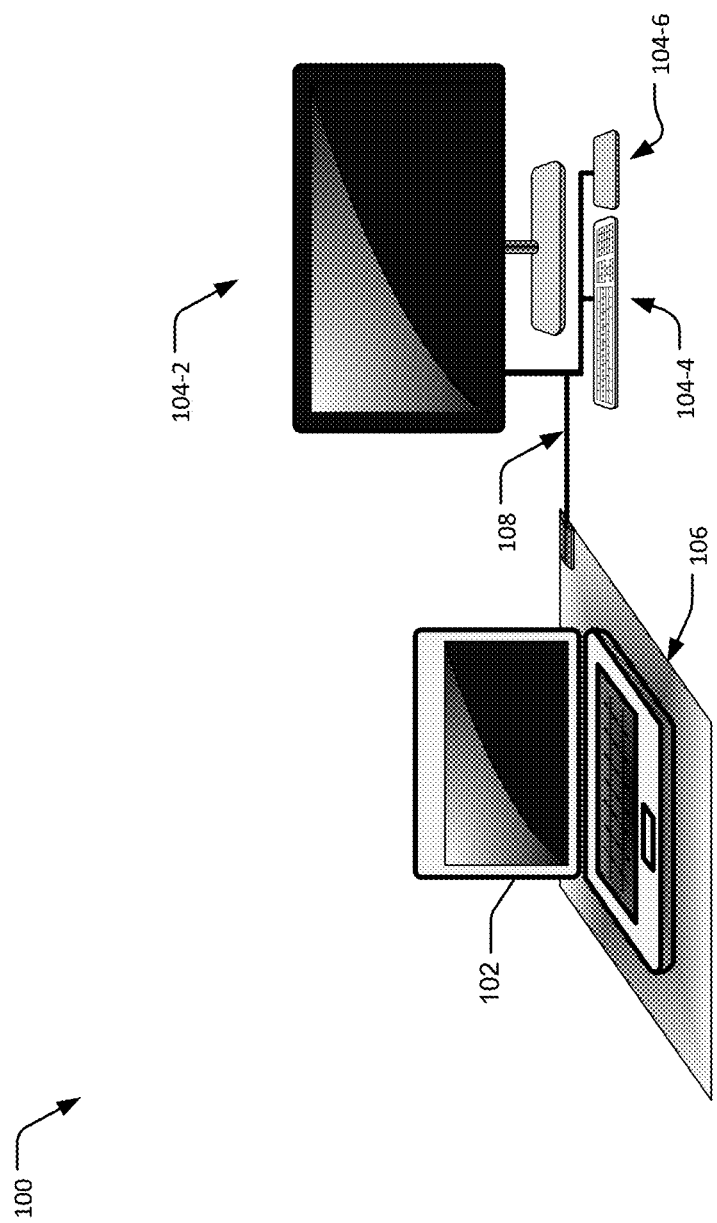
FIG. 1 illustrates an example docking station arrangement.

FIG. 1 illustrates an example docking station arrangement 100 that shows a device (e.g., wireless device) connecting with peripheral devices through a wireless docking station. FIG. 1 includes, for example, a wireless device 102, peripheral devices 104, a (wireless) docking station 106, and a wired link 108. The peripheral devices 104 include, for example, a monitor 104-2, a keyboard 104-4, and a mouse 104-6, The wireless device 102 utilizes the docking station 106 to establish wireless communications with the peripheral devices 104. For example, the wireless device 102 is using the monitor 104-2 as an extended wireless display (i.e., Wi-Di). In this example, the wireless device 102 is positioned in close proximity (e.g., few millimeters) with the docking station 106 in order to utilize the monitor 104-2. The docking station 106 herein may be connected to the monitor 104-2 through the wired link 108. On the other hand, the wireless connectivity between the wireless device 102 and the docking station 106 is implemented through their respective coupler antennas (not shown).

For example, their respective coupler antennas are positioned perpendicularly with each other in order to facilitate position flexibility during docking operations between the wireless device 102 and the docking station 106. In this example, the wireless device 102 and the docking station 106 utilizes WiGig frequencies (e.g., 60 GHz) to transmit or receive data through their respective coupler antennas.

In another scenario, the wireless device 102 utilizes the docking station 106 for wireless charging. For example, the wireless device 102 includes a wireless charging unit (not shown) that is configured to receive a capacitive wireless power transfer from the docking station 106. In this example, the capacitive wireless power transfer is implemented through electrical influence between the wireless charging unit and a capacitive-charger component (not shown) of the docking station 106.

The docking station 106 may include a WiGig transceiver (not shown) configured to operate at WiGig frequencies when communicating with the docked wireless device 102 for the docking station arrangement 100. Furthermore, the docking station 106 may include other wireless radio interfaces such as Bluetooth communication, wireless fidelity (Wi-Fi) feature, near field communications (NFC) communication, or other wireless transceiver that utilizes a minimal power as compared to power usage of the WiGig transceiver of the docking station 106.

The wireless device 102 may include, but is not limited to, Ultrabook™, a tablet computer, a netbook computer, a notebook computer, a laptop computer, mobile phone, a cellular phone, a smartphone, a personal digital assistant, a multimedia playback device, a digital music player, a digital video player, a navigational device, a digital camera, and the like. Furthermore, the wireless device 102 may further include radio interfaces such as Bluetooth communication, Wi-Fi feature, NFC communication, or the like, which may be used to establish initial communication with the docking station 106. The initial communication, for example, may not necessarily include an automatic activation of the WiGig transceiver of the docking station 106. Instead, the initial communication may include a request from the docking station 106 to communicate the present location of the docking wireless device 102.

Upon verification of identity and authorization of the docking wireless device 102, the WiGig transceiver of the docking station 106 is turned ON and thereafter, a high rate WiGig data communication is established between the docking wireless device 102 and the docking station 106.

With continuing reference to FIG. 1, the peripheral devices 104 may include, but are not limited to, Input, Output, or Storage peripheral devices 104. The input peripheral device 104 may provide input to the wireless device 102 from a user such as through the keyboard 104-4, mouse 104-6, or a webcam (not shown) etc. The output peripheral device 104 may provide output to the user such as, for example, the monitor 104-2 or a printer (not shown). A storage peripheral device 104 may store data (not shown) in between computing sessions such as through a hard drive (not shown) or flash drive (not shown).

Figure 2:
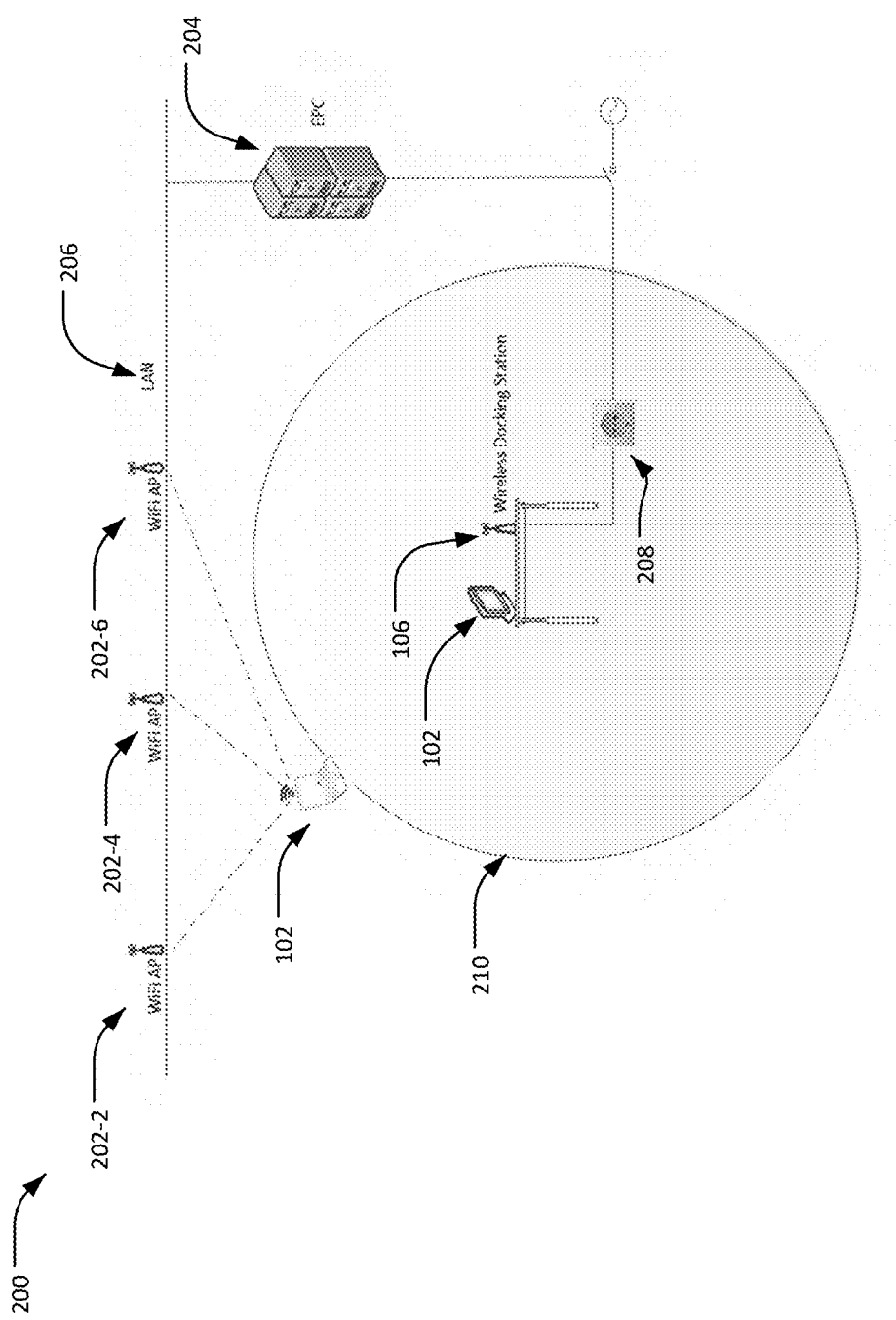
FIG. 2 illustrates an example arrangement that facilitates power savings in a wireless docking station as described herein.

FIG. 2 is an example arrangement 200 that facilitates power savings in the wireless docking station as described herein. As shown, the example arrangement 200 illustrates the wireless device 102 whose present location is determined, for example, through triangulation by Wi-Fi APs 202-2, 202-4, and 202-6. The arrangement 200 further shows an environmental power controller (EPC) 204, a connecting local area network (LAN) 206, the docking station 106 with a power source coming from a power plug 208, and a docking station coverage area 210.

In an implementation, the EPC 204 is a system that may be deployed in a particular place such as a building, in order to facilitate an integrated control of multiple power outlets within the building, to control the centralized air-conditioning, lighting control, deployment of Wi-Fi APs 202, and the like. In this implementation, the EPC 204 may include hardware, software, firmware, or a combination thereof, to implement the integrated control of power outlets, lightings, security controls, etc. within the particular place.

When the wireless device 102 is still beyond or outside of a perimeter defined by the coverage area 210 of the docking station 106, the EPC 204 may be configured to turn OFF, for example, the power plug 208 that generates a power source to the docking station 106. In other words, the WiGig transceiver and other radio interfaces of the docking station 106 are completely turned OFF while the wireless device is beyond the coverage area 210. The coverage area 210, in this example, is pre-configured to include a certain distance such as around 4-10 meters in radius. Furthermore, the coverage area 210 may be pre-configured to cover a specific area such as the size of a user's cubicle where the wireless device 102 is normally docked by the user.

As described herein, the geo-fencing approach to detect the present location of the wireless device 102 may be implemented through the Wi-Fi APs 202. For example, the triangulation method may be utilized by the Wi-Fi APs 202 in order to detect the location of the wireless device 102 with respect to the coverage area 210. In another example, the Bluetooth signal (not shown), NFC signal (not shown), and the like, of the wireless device 102 may be similarly utilized to detect its present location. In the latter example, the Bluetooth signal, NFC signal, and the like, are detected by another device (not shown) that is connected to the EPC 204 since at this stage, the docking station 106 is completely turned OFF.

At the instance that the wireless device 102 enters into the coverage area 210, the geo-fencing approach such as those facilitated by the Wi-Fi APs 202, Bluetooth signal detector (not shown), and the like, may trigger a notification to the EPC 204 through the LAN 206. With this notification, the EPC 204 may be configured to send a signal that activates or turns ON the power plug 208 to supply a power source to the docking station 106. The docking station 106 may now activate its WiGig transceiver in order to perform a scanning operation to establish WiGig communication with the docking wireless device 102.

During or at the end of the WiGig data communications and the user, for example, moves the wireless device 102 away from the coverage area 210, the geo-fencing approach through the Wi-Fi APs 210 may again detect this instance and sends another notification to the EPC 204. Based from this latest notification, the EPC 204 may facilitate the turning OFF of the power plug 208 and the process as discussed above is repeated.

Figure 3:
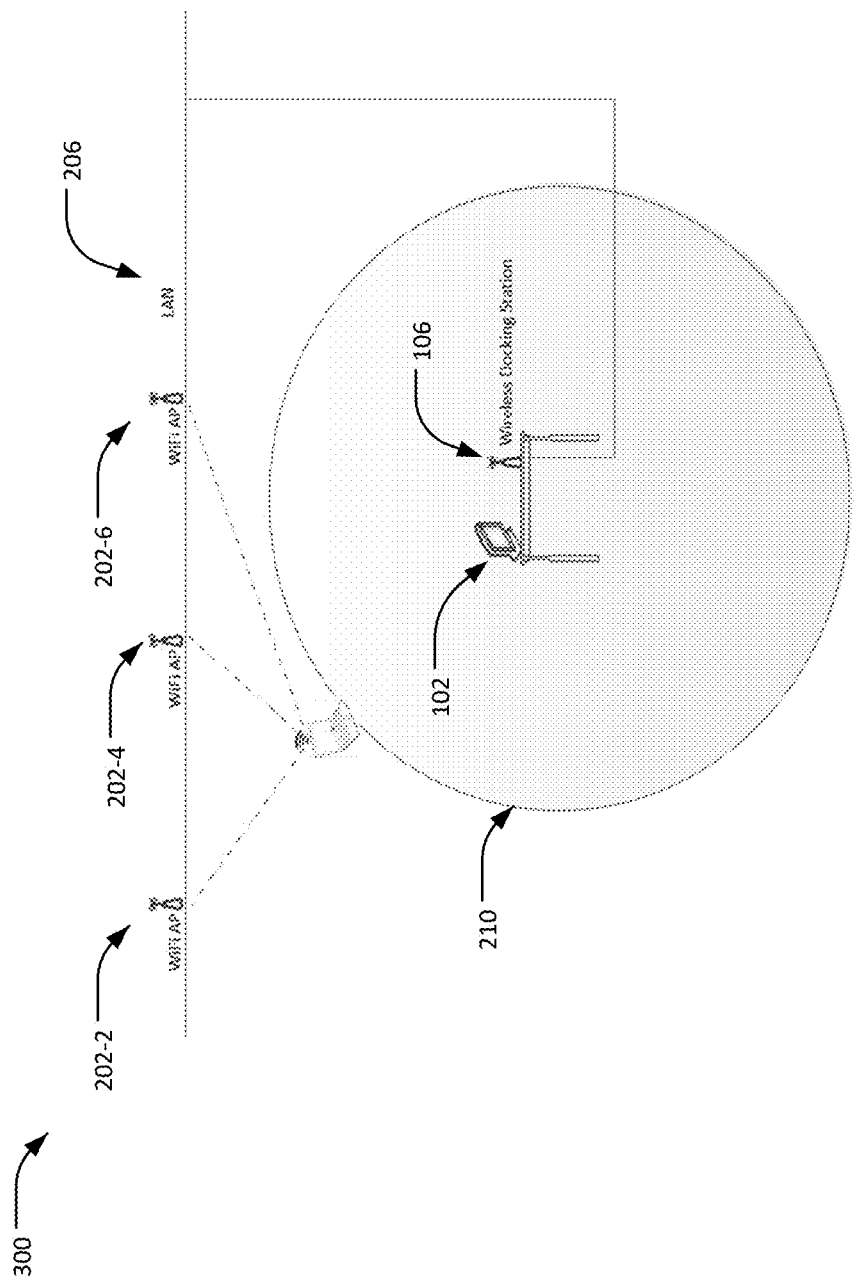
FIG. 3 illustrates another example arrangement that facilitates power savings in a wireless docking station as described herein.

FIG. 3 is an example arrangement 300 that facilitates power savings in the wireless docking station as described herein. As compared to the foregoing arrangement 200, the example arrangement 300 eliminates the use of the EPC 204 and the power plug 208, which are utilized to control the power source of the docking station 106.

As described in the present implementation, the power source for the docking station 106 is not turned OFF as in the previous arrangement 200; however, a particular communication channel (e.g., side band channel) may be utilized by the LAN 206 to send a triggering signal to the docking station 106. For example, the WiGig transceiver (not shown) of the docking station 106 is initially at OFF state. In this example, the triggering signal from the geo-fencing approach may be communicated through the LAN 206 and thereafter received by the docking station 106. With the received triggering signal, the WiGig transceiver of the docking station 106 is turned ON and may begin to send the scanning signal to establish the WiGig data communications with the wireless device 102.

In another implementation, the particular communication channel may not necessarily use the LAN 206. Instead, the triggering signal from the Wi-Fi AP 202 may be communicated wirelessly using the particular communication channel.

Figure 4:
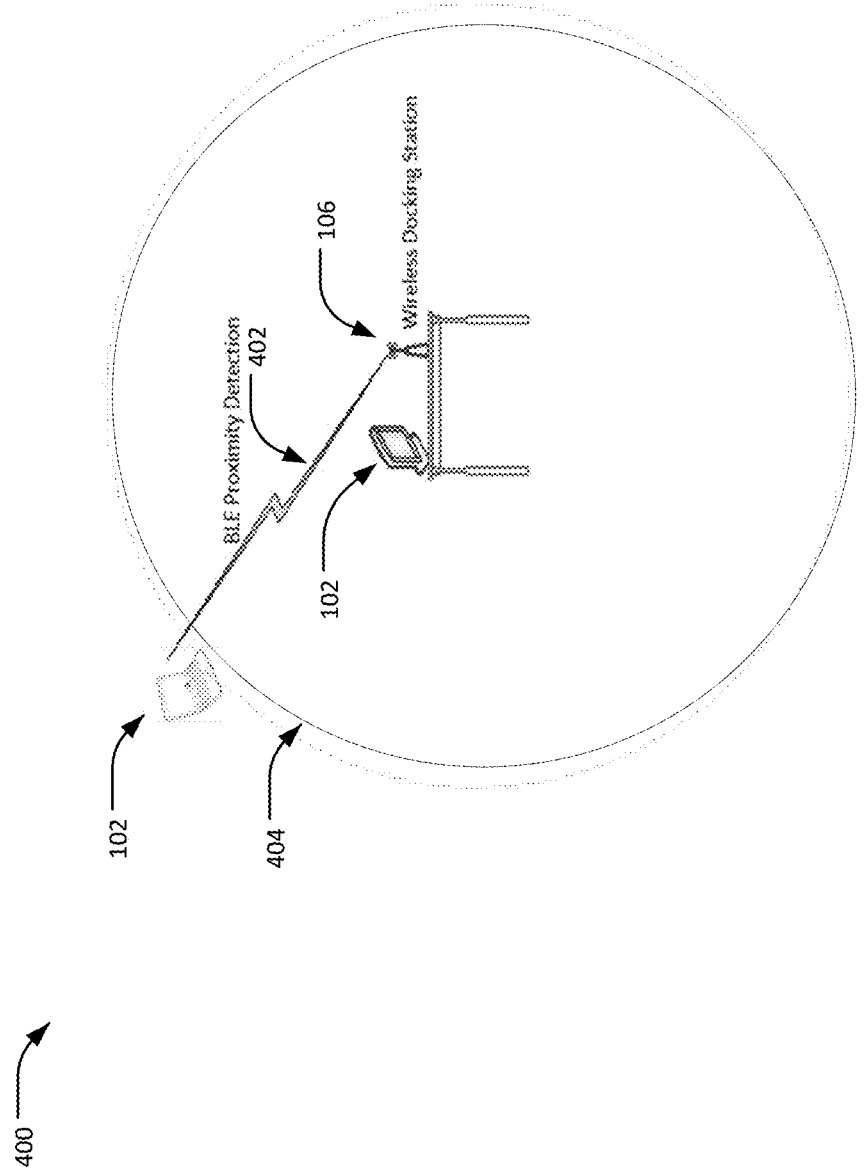
FIG. 4 illustrates another example arrangement that facilitates power savings in a wireless docking station as described herein.

FIG. 4 is an example arrangement 400 that facilitates power savings in the wireless docking station as described herein. As shown, the example arrangement 400 illustrates the wireless device 102 whose proximity location is determined, for example, through a Bluetooth signal 402. The arrangement 400 further shows a coverage area 404 for the docking station 106.

As described in the present implementations herein, wireless device 102 and the docking station 106 are configured to include Bluetooth features or circuitries to form a proximity detection mechanism. For example, the coverage area 404 may be defined by an equivalent received signal strength indicator (RSSI) that may be received and measured at the docking station 106. In this example, the Bluetooth signal 402 is being transmitted from the wireless device 102.

Similar to the discussion in arrangement 200 above, the WiGig transceivers of the wireless device 102 and the docking station 106 are at OFF states while the wireless device 102 is located outside of the perimeter defined by the coverage area 404. However, once the wireless device 102 enters the coverage area 404, a triggering signal (not shown) within the receiver circuitries of the docking station 106 may activate its WiGig transceiver to ON state. Similarly, the wireless device 102 turns ON its WiGig transceiver based on a detection of a scanning signal from the docking station 106. In other words, the entry of the wireless device 102 within the coverage area 404 may facilitate the activation of their respective WiGig transceivers.

As described herein, the coverage area 404 may be defined by a pre-configured amount of RSSI that may be received and measured by the docking station 106. The pre-configured amount of RSSI, for example, may correspond to the size of the user's cubicle in a particular office or building. In this example, the docking station 106 may save power by not activating its WiGig transceiver until the wireless device 102 is detected to be within the coverage area 404.

Figure 5:
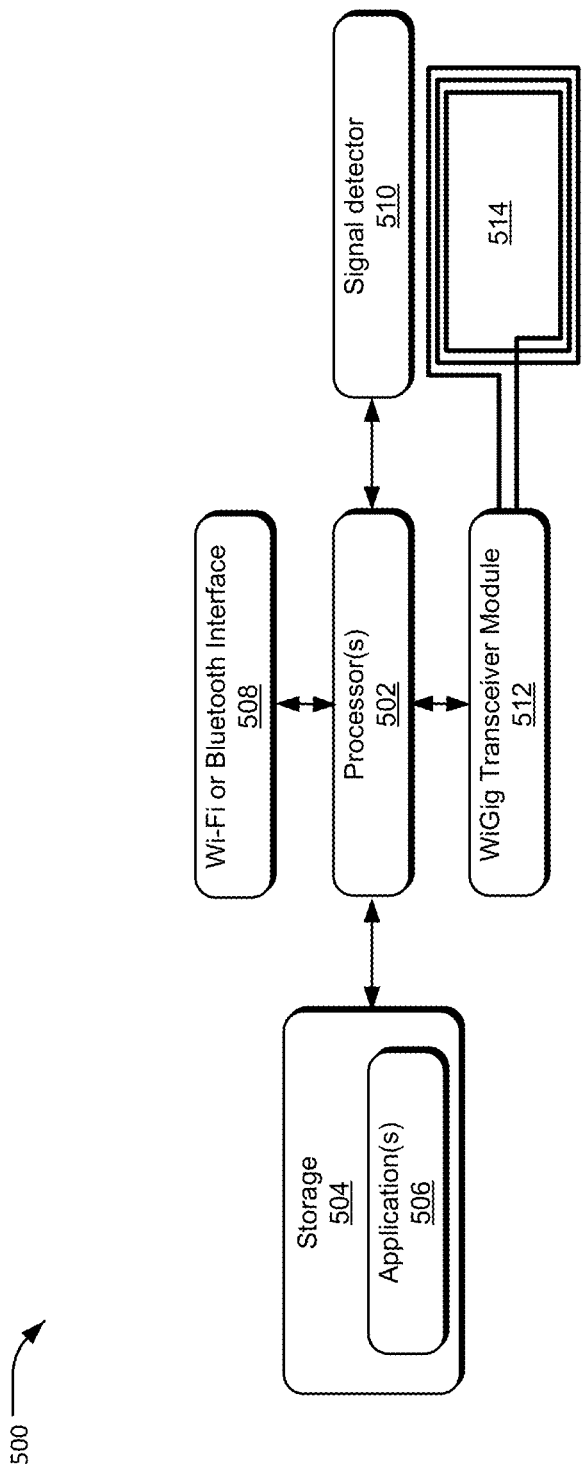
FIG. 5 illustrates an example transceiver circuitry of a docking station as described in present implementations herein.

FIG. 5 illustrates an example transceiver circuitry 500 of the docking station 106 as described in present implementations herein. As shown, the docking station 106 may be configured to be an independent wireless device by itself. That is, the docking station 106 may have its own processor (s) 502, a storage 504, and applications 506. The docking station 106 may further include a radio interface component such as Wi-Fi or Bluetooth interface 508, a signal detector 510, and a WiGig transceiver module 512 that is further connected to a coupler antenna 514.

In an implementation, the processor 502 may be configured to execute stored instructions or any of a number of applications 506 residing within the storage 504. In this implementation, the processor 502 is configured to control and coordinate the overall operations of the docking station 106. For example, to implement the illustrated arrangements 200-300 as discussed above, the processor 502 may run the application 204 that activates the WiGig transceiver module 512 upon: receiving of the triggering signal from the LAN 206, detection of the RSSI indicating presence of the wireless device 102 within the coverage areas 210 or 404, upon receiving of the triggering signal through wired or wireless side-band channel, or upon receiving of the present location of the wireless device 102 through Wi-Fi or Bluetooth channels.

The storage 504 may be a miniature memory of the docking station 106. For example, the storage 504 may include any form of random access memory (RAM), read-only memory (ROM), flash memory, or the like. In this example, the processor 502 may have direct access to the storage 504.

Coupled to the processor 502 is the WiGig transceiver module 512 that may be utilized to control scanning and establishing of (WiGig) data communications through the coupler antenna 514. For example, in arrangement 300, the WiGig transceiver module 512 is activated by the processor 502 upon receiving of the triggering signal through the LAN 206. In this example, the signal detector 510 may be configured to receive the triggering signal and forwards the same to the processor 502.

In another example, such as in arrangement 400, the signal detector 510 may be configured to receive and detect the RSSI of the Bluetooth signal 402 from the transmitting wireless device 102. In this example, the processor 502 may compare the measured RSSI to a particular threshold and determine whether the transmitting wireless device 102 is located within the coverage area 404.

In response to the determination that the wireless device 102 has entered the coverage area 404, the processor 502 may be configured to send a control signal to activate the WiGig transceiver module 512. Otherwise, in this arrangement, the WiGig transceiver module 512 remains OFF to save power in the docking station 106.

During WiGig data communication, the WiGig transceiver module 512 may be further configured to process electrical signals (not shown), which are received through the coupler antenna 514. Furthermore, the WiGig transceiver module 512 may facilitate tuning of the coupler antenna 514 for maximum power transfer during transmit or receive operations. The WiGig transceiver 512, in these instances, may be integrated with the coupler antenna 514 and/or the processor 502 to form a single module.

With continuing reference to FIG. 5, the radio interface 508 of the docking station 106 may be configured to communicate with the wireless device 102 through Wi-Fi or Bluetooth communication channels. For example, the wireless device 102 is aware of its present location and transmits the same to the radio interface 508 using the Wi-Fi or Bluetooth communication channels. In this example, the received present location of the wireless device 102 may be utilized by the processor 502 in determining whether the wireless device 102 has entered the coverage area 404 as discussed above.

In another example, the Wi-Fi or Bluetooth communication channels may be further utilized to determine security identification and/or authorization of the wireless device 102 to dock in the docking station 106. In this example, the processor 502 may be configured to determine the identification (e.g., MAC identification) of the wireless device 102 that intends to dock in the docking station 106.

In another implementation, the radio interface 508 may utilize an NFC communication feature to determine security identification of the docking wireless device 102. In all these examples and implementations, it is assumed that the activation of the WiGig transceiver module 512 may consume more power as compared to power consumption during Wi-Fi, Bluetooth, or NFC communication.

Although FIG. 5 shows one coupler antenna 514, different other antennas (not shown) may be utilized for Wi-Fi, Bluetooth, or NFC communication signals.

Figure 6:
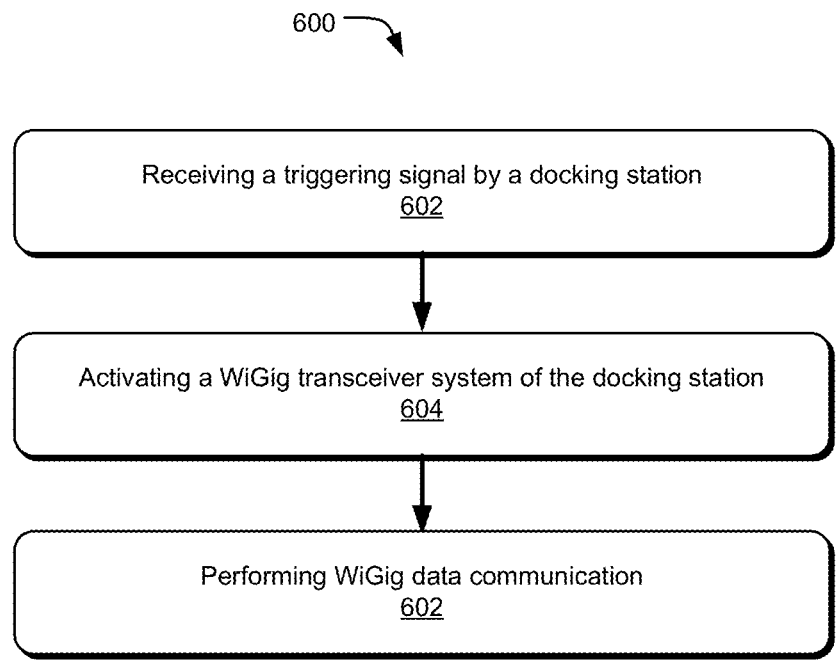
FIG. 6 shows an example process chart illustrating an example method of implementing location based—power saving in a docking station device.

FIG. 6 shows an example process chart 600 illustrating an example method of implementing location based—power saving in a docking station device. For example, the process chart 600 utilizes a geo-fencing approach from Wi-Fi APs within a particular place or building. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, receiving of a triggering signal by a docking station is performed. For example, a geo-fencing approach is implemented by the Wi-Fi APs 202 to determine present location of the docking wireless device 102. Upon detection by the Wi-Fi APs 202 that the wireless device 102 has entered or is presently within the coverage area 210 of the docking station 106, the triggering signal may be transmitted by the Wi-Fi AP 202 to the docking station 106 through the EPC 204 if there is one. Otherwise, if there is no EPC in between the Wi-Fi APs 202 and the docking station 106, the triggering signal may be received directly by the signal detector 510 of the docking station 106 through the LAN 206.

At block 604, activating a WiGig transceiver system of the docking station based upon the received triggering signal is performed. For example, based upon the received triggering signal, the processor 502 may facilitate activation of the WiGig transceiver module 512. In this example, the WiGig transceiver module 512 may transmit a scanning signal to wireless devices such as the wireless device 102 that may be authorized to dock in the docking station 106.

At block 606, performing WiGig data communication is performed. For example, after a security identification or verification of the wireless device 102, the docking station 106 may establish WiGig data communication with the wireless device 102.

Figure 7:
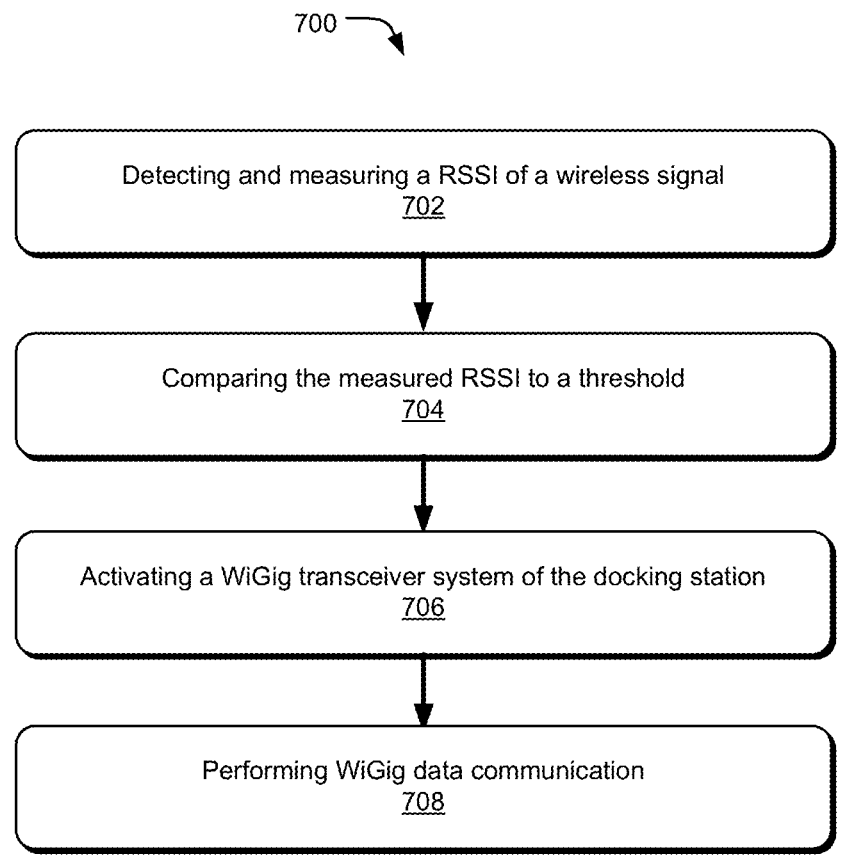
FIG. 7 shows an example process chart illustrating another example method of implementing location based—power saving in a docking station device.

FIG. 7 shows an example process chart 700 illustrating another example method of implementing location based—power saving in a docking station device. For example, the process chart 700 utilizes a direct measurement of the RSSI of a wireless signal that is transmitted by the docking wireless device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, detecting and measuring a RSSI of a wireless signal is performed. For example, the signal detector 510 is configured to detect and measure the wireless signal such as a Bluetooth signal from the docking wireless device 102. In this example, the measured Bluetooth signal may be utilized as the triggering signal as described in present implementations herein.

At block 704, comparing the measured RSSI with a pre-configured threshold is performed. For example, the processor 502 is configured to compare the measured RSSI with an RSSI-equivalent (i.e., pre-configured threshold) of the coverage area 404. In this example, the processor 502 may perform an application 506 that compares the measured RSSI with the pre-configured threshold corresponding to the coverage area 404.

At block 706, in response to the RSSI that satisfies the pre-configured threshold, activating a WiGig transceiver system of the docking station is performed. For example, the processor 502 may facilitate activation of the WiGig transceiver module 512 in response to the determination that the RSSI is equal to or above the pre-configured threshold value. In this example, the WiGig transceiver module 512 may again transmit a scanning signal to verify identification of the wireless device 102.

At block 708, performing WiGig data communication is performed. For example, after a security identification or verification of the wireless device 102, the docking station 106 may establish WiGig data communication with the wireless device 102.

Figure 8:
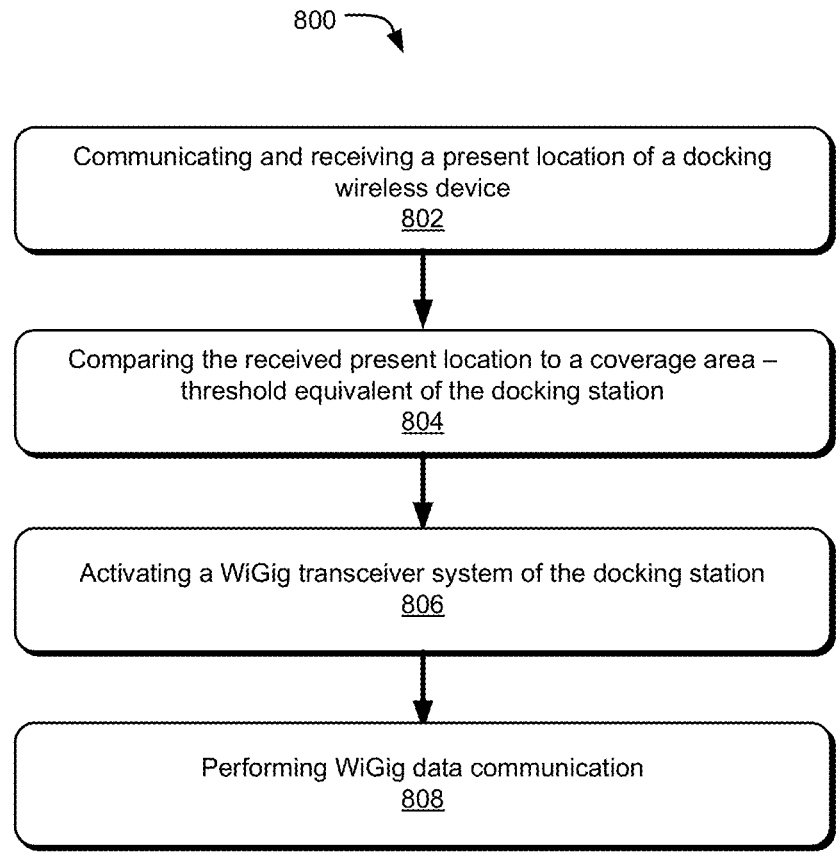
FIG. 8 shows an example process chart illustrating another example method of implementing location based—power saving in a docking station device.

FIG. 8 shows an example process chart 800 illustrating another example method of implementing location based—power saving in a docking station device. For example, the process chart 800 utilizes a radio interface feature of the docking station to receive a present location of the docking wireless device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 802, communicating and receiving a present location of a docking wireless device using a radio interface is performed. For example, the radio interface 508 of the docking station 106 communicates with the docking wireless device 102 through Wi-Fi, Bluetooth, or a cellular network signal. In response to a location request from the docking station 106, the wireless device 102 may communicate to the radio interface 508 its present location—that may determined by its Location Based Services (LBS) feature such as the Global Positioning System (GPS).

At block 804, comparing the received present location with a pre-configured threshold is performed. For example, the processor 502 is configured to compare the received present location with a pre-configured threshold equivalent of the coverage area 210 or 404. In this example, the present location is derived from the LBS feature of the docking wireless device 102.

At block 806, in response to the received present location that satisfies the pre-configured threshold, activating a WiGig transceiver system of the docking station is performed. For example, the processor 502 may facilitate activation of the WiGig transceiver module 512 in response to the determination that the GPS-derived present location is equal to or above the pre-configured threshold value. In this example, the WiGig transceiver module 512 may again transmit a scanning signal to verify identification of the wireless device 102.

At block 808, performing WiGig data communication is performed. For example, after a security identification or verification of the wireless device 102, the docking station 106 may establish WiGig data communication with the wireless device 102.

The following examples pertain to further embodiments:

Example 1 is a docking station comprising: a processor configured to process a received triggering signal that comprises a current location of a docking wireless device; a transceiver module coupled to the processor, wherein the processor is configured to activate the transceiver module based upon the received triggering signal; and a coupler antenna coupled to the transceiver module, wherein the coupler antenna is configured to facilitate data communication with the docking wireless device.

In example 2, the docking station as recited in example 1 further comprising a signal detector configured to detect and measure a received strength signal indicator (RSSI) of a Bluetooth signal, wherein the signal detector is further configured to generate the triggering signal based upon the measured RSSI of the Bluetooth signal.

In example 3, the docking station as recited in example claim 2, wherein the signal detector is further configured to receive the triggering signal from a wireless fidelity access point (Wi-Fi AP), wherein the Wi-Fi AP is configured to perform a geo-fencing approach to determine a current location of the docking wireless device.

In example 4, the docking station as recited in example 1 further comprising a radio interface component configured to receive a current location of the docking wireless device, wherein the current location is derived from a Global Positioning System (GPS) feature of the docking wireless device.

In example 5, the docking station as recited in example 4, wherein the radio interface component comprises a Wi-Fi or Bluetooth radio interface component and is configured to receive the current location through the Wi-Fi or Bluetooth component.

In example 6, the docking station as recited in example 1, wherein the transceiver module comprises a WiGig transceiver module that operates at WiGig frequencies.

In example 7, the docking station as recited in example 1, wherein the activated transceiver module is configured to perform a scanning operation to identify authorization of the docking wireless device prior to establishment of WiGig data communication.

In example 8, the docking station as recited in any of examples 1 to 7, wherein the processor is further configured to facilitate turning off the transceiver module when the docking wireless device exits a pre-configured coverage area of the docking station.

Example 9 is a circuit comprising: a signal detector configured to receive a triggering signal comprising a current location of a docking wireless device; a processor configured to process the received triggering signal; a transceiver module coupled to the processor, wherein the processor is configured to activate the transceiver module based upon the triggering signal; and a coupler antenna coupled to the transceiver module, wherein the coupler antenna is configured to facilitate data communication with the docking wireless device.

In example 10, the circuit as recited in example 9, wherein the signal detector is configured to receive the triggering signal from a wireless fidelity access point (Wi-Fi AP) wherein the Wi-Fi AP is configured to perform a geo-fencing approach to determine the entry of the docking wireless device within the coverage area.

In example 11, the circuit as recited in example 9, wherein the transceiver module comprises a WiGig transceiver module that operates at WiGig frequencies.

In example 12, the circuit as recited in any of examples 9 to 11, wherein the signal detector is further configured to detect and measure a received strength signal indicator (RSSI) of a Bluetooth signal, wherein the triggering signal is based upon the measured RSSI of the Bluetooth signal.

Example 13 is a method of implementing a location-based power saving solution for a docking station, the method comprising: with circuitry in the docking station, receiving a triggering signal that comprises a current location of a docking wireless device; with the circuitry in the docking station, activating a transceiver module of the docking station based on the received triggering signal; and with the circuitry in the docking station, performing data communication.

In example 14, the method as recited in example 13, wherein the triggering signal is based upon an entry of a docking wireless device within a pre-configured coverage area of a docking station that comprises the transceiver module.

Example 15, is the method as recited example 13, wherein the data communication comprises WiGig data communication.

Example 16, is the method as recited in any of examples 13 to 15, wherein the current location is detected through a geo-fencing approach or through a Global Positioning System (GPS) feature of the docking wireless device.

Example 17 is a system comprising: a docking station comprised of a processor, a transceiver coupled to the processor, and a coupler antenna coupled to the transceiver; and a wireless device that is docked to the docking station, configured to a triggering signal that indicates current location of the wireless device, wherein the transceiver of the docking station is configured to activate upon receiving the triggering signal.

In example 18, the system of example 17, wherein the docking station is comprised of a signal detector configured to detect and measure a received strength signal indicator (RSSI) of a Bluetooth signal, wherein the signal detector is further configured to generate the triggering signal based upon the measured RSSI of the Bluetooth signal.

In example 19, the system of example 17, wherein the docking station is further configured to facilitate turn off when the docking wireless device exits a pre-configured coverage area of the docking station.

In example 20, the system of any of examples 17 to 19, wherein the transceiver is configured to be activated to perform a scanning operation to identify authorization of the docking wireless device prior to establishment of WiGig data communication.

What is claimed is:

1. A docking station comprising:
a power input configured to provide power to the docking station, the power input being coupled to a power source that selectively couples power to the power input based upon a triggering signal received from an external device, the triggering signal being sent by the external device in response to a docking wireless device entering a pre-configured coverage area associated with the docking station prior to the docking wireless device docking with the docking station,
wherein the docking wireless device and the docking station are different from the external device, and
wherein the power source is initially decoupled from the power input to cause the docking station to be powered off, the power source being further configured to couple power to the power input in response to receiving the triggering signal; and a coupler antenna coupled to a transceiver, wherein the coupler antenna is configured to facilitate data communication with the docking wireless device via the transceiver upon the power source coupling power to the power input to power on the docking station.

2. The docking station as recited in claim 1, wherein:

the external device is a coupled to one or more wireless fidelity access points (Wi-Fi APs), the pre-configured coverage area is associated with a geofence, and the one or more Wi-Fi APs are configured to determine that the docking wireless device has entered the pre-configured coverage area when a current location of the docking wireless device has crossed the geofence.

3. The docking station as recited in claim 1, wherein the transceiver comprises a WiGig transceiver that is configured to operate at WiGig frequencies.

4. The docking station as recited in claim 1, wherein the transceiver is configured to, upon being activated, perform a scanning operation to identify authorization of the docking wireless device prior to establishment of a WiGig data communication.

5. The docking station as recited in claim 1, wherein the power source is further configured to decouple power from the power input when the docking wireless device exits the pre-configured coverage area to power down the docking station.

6. The docking station as recited in claim 1, wherein the pre-configured coverage area corresponds to a boundary defined by a geofence.

7. A circuit comprising:

a power input configured to provide power to a docking station, the power input being coupled to a power source that selectively couples power to the power input based upon a triggering signal received from an external device, the triggering signal being sent in response to a docking wireless device entering a pre-configured coverage area associated with the docking station prior to the docking wireless device docking with the docking station, wherein the power source is initially decoupled from the power input to cause the docking station to be powered off, the power source being further configured to couple power to the power input in response to receiving the triggering signal; and a coupler antenna coupled to a transceiver, wherein the coupler antenna is configured to facilitate data communication with the docking wireless device via the transceiver upon the power source coupling power to the power input to power on the docking station.

8. The circuit as recited in claim 7, wherein:

the external device is coupled to one or more a wireless fidelity access points (Wi-Fi APs), the pre-configured coverage area is associated with a geofence, and the Wi-Fi APs are configured to determine that the docking wireless device has entered the pre-configured coverage area when a current location of the docking wireless device has crossed the geofence.

9. The circuit as recited in claim 7, wherein the transceiver comprises a WiGig transceiver that is configured to operate at WiGig frequencies.

10. A method of implementing a location-based power saving solution for a docking station, the method comprising:

receiving, at a power source, a triggering signal from an external device, the triggering signal being sent in response to a docking wireless device entering a pre-configured coverage area associated with the docking station prior to the docking wireless device docking with the docking station;

in response to receiving the triggering signal, coupling, via the power source, power to a power input of the docking station, the power source being initially decoupled from the power input causing the docking station to be powered off; and upon coupling power to the power input of the docking station to power on the docking station, performing, with circuitry in the docking station, data communication with the docking wireless device.

11. The method as recited in claim 10, wherein the pre-configured coverage area is associated with a geofence, and wherein the docking wireless device entering the pre-configured coverage area associated with the docking station is detected when a current location of the docking wireless device crosses the geofence.

12. The method as recited in claim 10, wherein the data communication comprises WiGig data communication.

13. A system comprising:

a docking station comprising a processor, a transceiver coupled to the processor, and a coupler antenna coupled to the transceiver;

a power source configured to selectively couple power to a power input of the docking station based upon a triggering signal received from an external device;

a wireless device that is dockable to the docking station; and an external device configured to generate the triggering signal in response to the wireless device entering a pre-configured coverage area associated with the docking station prior to the docking wireless device docking with the docking station, wherein the power source is initially decoupled from the power input to cause the docking station to be powered off, the power source being further configured to couple power to the power input in response to receiving the triggering signal, and wherein the transceiver is configured to facilitate communication between the docking station and the wireless device upon the power source coupling power to the power input to power on the docking station.

14. The system of claim 13, wherein the transceiver is configured to be activated to perform a scanning operation to identify authorization of the wireless device upon docking with the docking station prior to establishment of WiGig data communication.

15. The system of claim 13, wherein the power source is further configured to decouple power from the power input when the wireless device exits the pre-configured coverage area associated with the docking station.

* * * * *